US012764537B2

(12) United States Patent
Parimi et al.

(10) Patent No.: US 12,764,537 B2
(45) Date of Patent: Oct. 13, 2026

(54) PASSWORD-LESS LOGIN FOR ONLINE ACCESS

(71) Applicant: Zumigo, Inc., San Jose, CA (US)

(72) Inventors: Venkatarama S. Parimi, Dublin, CA (US); Chirag C. Bakshi, San Jose, CA (US); Saravanan Jagadheson, Fremont, CA (US)

(73) Assignee: Zumigo, Inc., San Jose, CA (US)

( * ) Notice: Subject to any disclaimer, the term of this patent is extended or adjusted under 35 U.S.C. 154(b) by 417 days.

(21) Appl. No.: 18/300,276

(22) Filed: Apr. 13, 2023

(65) Prior Publication Data

US 2024/0323692 A1 Sep. 26, 2024

Related U.S. Application Data

(60) Provisional application No. 63/492,201, filed on Mar. 24, 2023.

(51) Int. Cl.

| | |
|---|---|
| ***H04W 12/108*** | (2021.01) |
| ***H04W 12/06*** | (2021.01) |
| ***H04W 12/40*** | (2021.01) |
| ***H04W 12/69*** | (2021.01) |

(52) U.S. Cl.

CPC ......... *H04W 12/108* (2021.01); *H04W 12/06* (2013.01); *H04W 12/40* (2021.01); *H04W 12/69* (2021.01)

(58) Field of Classification Search

CPC ... H04W 12/06; H04W 12/108; H04W 12/40; H04W 12/69

See application file for complete search history.

(56) References Cited

U.S. PATENT DOCUMENTS

| | | | |
|---|---|---|---|
| 10,299,118 B1 | 5/2019 | Karachiwala et al. | |
| 11,032,272 B2 * | 6/2021 | Manepalli | H04W 12/06 |
| 2011/0219427 A1 * | 9/2011 | Hito | H04L 63/0853 726/3 |
| 2014/0282961 A1 | 9/2014 | Dorfman et al. | |
| 2014/0289508 A1 | 9/2014 | Wang | |

(Continued)

FOREIGN PATENT DOCUMENTS

WO 2021/212001 A1 10/2021

OTHER PUBLICATIONS

International Search Report and Written Opinion mailed Jun. 26, 2024 in International Application No. PCT/US2024/020993, 15 pages.

*Primary Examiner* — Nguyen T Vo
(74) *Attorney, Agent, or Firm* — Kim & Stewart LLP

(57) ABSTRACT

A method of authenticating a customer to allow the customer to log in to an account, includes the steps of: in response to a request to authenticate the customer based on a first mobile identifier (ID), generating a code that encodes a uniform resource locator (URL), and then transmitting the generated code to a computer that is managing access to the account; examining a network packet routed according to the URL and determining a second mobile ID using the network packet; comparing the first mobile ID to the second mobile ID; and based on a determination that the first mobile ID matches the second mobile ID, determining that the customer is authenticated, and then transmitting a message to the computer that the customer is permitted to log in to the account.

20 Claims, 8 Drawing Sheets

(56) References Cited

U.S. PATENT DOCUMENTS

| | | | | |
|---|---|---|---|---|
| 2016/0373428 | A1 | 12/2016 | Shi | |
| 2020/0245142 | A1* | 7/2020 | Manepalli | H04L 63/102 |
| 2020/0366669 | A1* | 11/2020 | Gupta | G06K 19/06028 |
| 2021/0211876 | A1* | 7/2021 | Bakshi | H04W 12/068 |
| 2023/0085137 | A1* | 3/2023 | Naujok | H04L 63/0428<br>713/168 |
| 2024/0121238 | A1* | 4/2024 | Chin | H04L 63/0853 |

* cited by examiner

PASSWORD-LESS LOGIN FOR ONLINE ACCESS

CROSS-REFERENCE TO RELATED APPLICATION(S)

This application claims the benefit of U.S. Provisional Patent Application No. 63/492,201, filed Mar. 24, 2023, which is herein incorporated by reference in its entirety.

BACKGROUND OF THE INVENTION

Field of the Invention

Embodiments of the present invention generally relate to wireless tele-communication systems and, more specifically, to systems and methods for authenticating users of websites without requiring the users to enter passwords.

Description of the Related Art

Traditionally, a user of a website is required to enter a user ID and password to log in to an account on the website. Entry of the password demonstrates a knowledge factor associated with the login request (knowledge of the password). It is also common practice for the website to require an additional factor of authentication before allowing the user to log in. For example, the website may transmit a one-time passcode (OTP) via a text message to a phone number associated with the user's account. The user then enters the OTP to demonstrate a possession factor associated with the login request (possession of a mobile phone on which the phone number is activated).

However, traditional methods of logging in are burdensome for users. Users are required to create and memorize passwords, which are encouraged to be long and complex and to be changed regularly. Otherwise, users' passwords are susceptible to being stolen and used by fraudsters who log in to the users' accounts to steal personal information and to perform transactions. A more efficient and effective method for authenticating users is desired.

SUMMARY OF THE INVENTION

One or more embodiments provide a method of authenticating a customer to allow the customer to log in to an account. The method includes the steps of: in response to a request to authenticate the customer based on a first mobile identifier (ID), generating a code that encodes a uniform resource locator (URL), and then transmitting the generated code to a computer that is managing access to the account; examining a network packet routed according to the URL and determining a second mobile ID using the network packet; comparing the first mobile ID to the second mobile ID; and determining that the customer is authenticated when the first mobile ID matches the second mobile ID, and then transmitting a message to the computer that the customer is permitted to log in to the account.

Further embodiments include an authentication computer configured to carry out the above method.

DETAILED DESCRIPTION

Techniques for authenticating a user (customer) logging in to an account are described. According to techniques, a computer of a vendor, such as a web server, manages access to the account. An authentication platform provides an authentication service to the web server, and as part of that authentication service, the authentication platform generates a code such as a quick response (QR) code. The code is transmitted to the customer via the web server, and the customer sees the code displayed on his or her computer, e.g., a laptop. The customer then scans the code using a mobile device on which a mobile identifier (ID) such as a phone number has been activated. When the customer scans the code, network packets are routed from the mobile device to the authentication platform according to a uniform resource locator (URL) encoded by the code. Using the network packets routed to the authentication platform, the authentication platform identifies the mobile ID of the mobile device and verifies that it matches a mobile ID that was previously registered with the vendor.

Furthermore, upon verifying the match, the authentication platform may determine if the mobile ID was recently activated on a new mobile device or new subscriber identity module (SIM) card, which potentially indicates fraudulent activity. If the mobile ID was recently activated on a new mobile device or SIM card, the authentication platform performs a second-factor authentication. One example of a second factor involves the mobile device cryptographically signing a piece of data using a private key that is associated with a public key possessed by the authentication platform. Another example involves the authentication platform transmitting an OTP to the mobile device as a push notification, which the customer then enters.

Because the techniques described herein are based on the customer scanning a code, the customer is not required to enter a password that the customer must create, memorize, and manage. Scanning the code merely requires a customer to possess the mobile device on which the registered mobile ID has been activated and to use that mobile device to scan. Furthermore, as optional extra layers of security, the techniques check for suspicious activity associated with the registered mobile ID and perform an additional factor of authentication if such activity is detected. Accordingly, the techniques authenticate customers securely while requiring minimal work for customers to log in to accounts to perform transactions. These and further aspects of the invention are discussed below with respect to the drawings.

Figure 1:
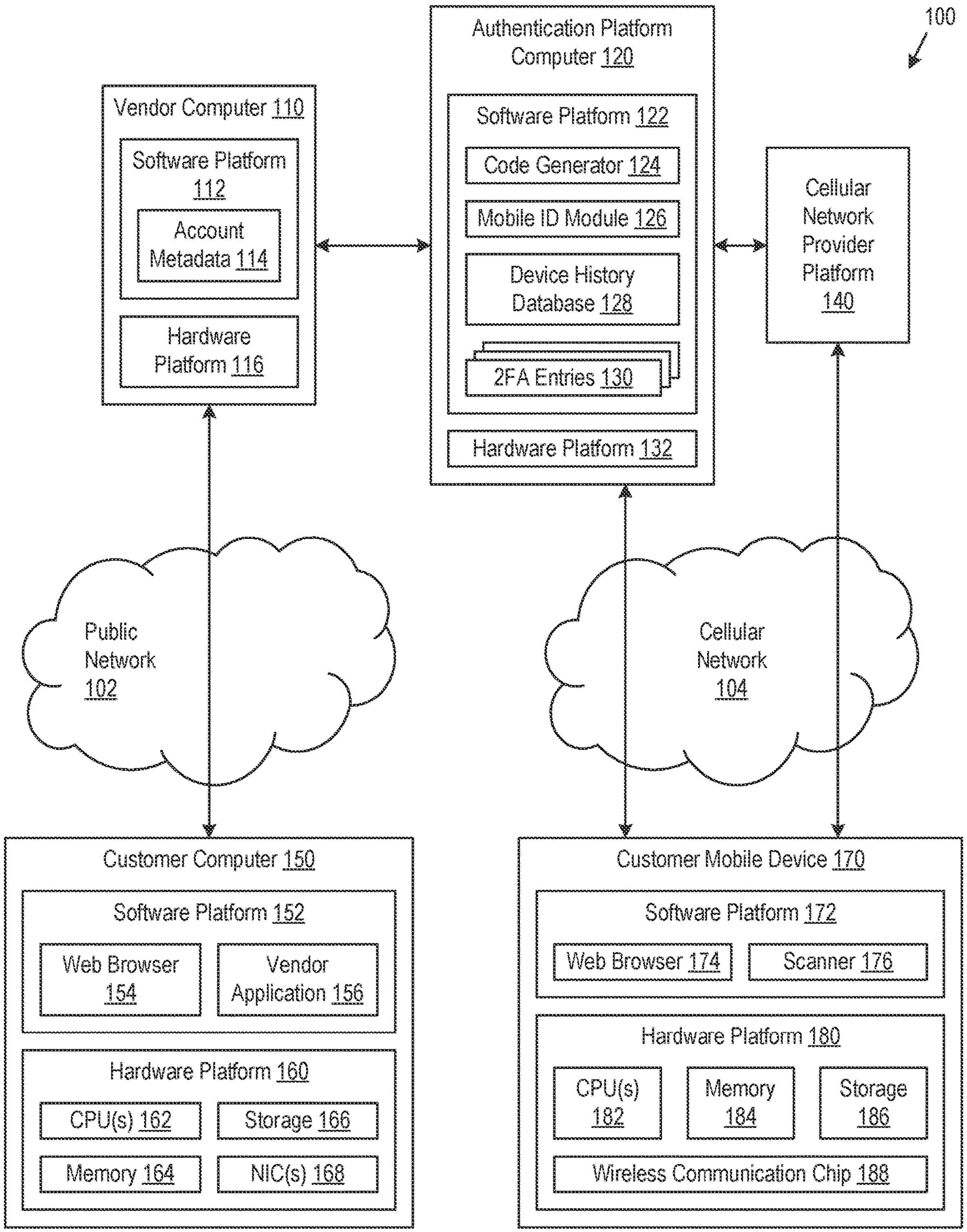
FIG. 1 is a block diagram of a wireless communication system in which embodiments may be implemented.

FIG. 1 is a block diagram of a wireless communication system 100 in which embodiments may be implemented. Wireless communication system 100 comprises a vendor computer 110, an authentication platform computer 120, a cellular network provider platform 140, a customer computer 150, and a customer mobile device 170. Vendor computer 110 is a computer used by a vendor such as a bank or electronic commerce (e-commerce) business to provide a good or service. Customer computer 150 is a computer used by a customer to access an account with the vendor remotely. Customer mobile device 170 is a mobile device used by the customer to authenticate with the vendor through authentication platform computer 120.

Customer computer 150 is constructed on a hardware platform 160 such as an x86 architecture platform. For example, customer computer 150 may be a tablet, laptop, or desktop computer. Hardware platform 160 includes conventional components of a computing device, such as one or more central processing units (CPUs) 162, memory 164 such as random-access memory (RAM), local storage 166 such as one or more magnetic drives or solid-state drives (SSDs), and one or more network interface cards (NICs) 168. NIC(s) 168 enable customer computer 150 to communicate with vendor computer 110 via a public network 102, such as the Internet.

Hardware platform 160 supports a software platform 152, which includes a web browser 154 and a vendor application 156. According to some embodiments, the customer accesses online services of the vendor via web browser 154. In web browser 154, the customer navigates to a URL of the vendor to log in and perform transactions. According to other embodiments, the customer accesses the online services via vendor application 156, which is a computer program that is provided by the vendor and that is designed to run on customer computer 150. Vendor application 156 facilitates interactions with vendor computer 110 similarly to web browser 154.

Customer mobile device 170 is constructed on a hardware platform 180. For example, customer mobile device 170 may be smartphone. Hardware platform 180 includes one or more CPUs 182, memory 184 such as RAM, storage 186 such as a flash memory device, and a wireless communication chip 188 such as a cellular modem. Wireless communication chip 188 enables customer mobile device 170 to communicate with authentication platform computer 120 and with cellular network provider platform 140 via a cellular network 104.

Hardware platform 180 supports a software platform 172, which includes a web browser 174 and a scanner 176. Scanner 176 is an application such as a camera application that is capable of scanning codes. According to techniques, a customer uses scanner 176 to scan a code that encodes a URL of authentication platform computer 120. Web browser 174 then navigates to the URL, and network packets are routed to authentication platform computer 120 according to the URL. The network packets are used for authenticating the customer, as discussed further below.

Vendor computer 110 is constructed on a hardware platform 116 such as an x86 architecture platform. For example, vendor computer 110 may be a server. Hardware platform 116 includes the conventional components of a computing device discussed above with respect to hardware platform 160. Hardware platform 116 supports a software platform 112, which hosts online services for the vendor. Software platform 112 stores account metadata 114, which includes user IDs of accounts created by customers of the vendor. Account metadata 114 further includes, for each account, a mobile ID such as a phone number that a customer has registered with the account.

Authentication platform computer 120 is constructed on a hardware platform 132 such as an x86 architecture platform. For example, authentication platform computer 120 may be a server. Hardware platform 132 includes the conventional components of a computing device discussed above with respect to hardware platform 160. CPU(s) of hardware platform 132 are configured to execute instructions such as executable instructions that perform one or more operations described herein, which may be stored in memory of hardware platform 132. Hardware platform 132 supports a software platform 122, which hosts an authentication platform. For example, the authentication platform may be a third-party authentication service provided to vendors such as that of vendor computer 110.

Software platform 122 includes a code generator 124, a mobile ID module 126, a device history database 128, and two-factor authentication (2FA) entries 130. Code generator 124 generates codes such as QR codes. Authentication platform computer 120 transmits the codes to vendor computer 110 to be displayed to the customer, and the customer scans the codes using scanner 176. QR codes are used herein as examples of codes, but embodiments are applicable to other codes that encode URLs of authentication platform computer 120.

Mobile ID module 126 analyzes network packets received from customer mobile device 170 to determine the mobile ID activated thereon. Mobile ID module 126 compares the determined mobile ID to a registered mobile ID received from vendor computer 110, the registered mobile ID being associated with an account that the customer is requesting to log in to. Device history database 128 includes information about the registered mobile ID, including IDs of mobile devices and SIM cards on which the registered mobile ID has been activated and dates on which the registered mobile ID was activated on the mobile devices and SIM cards. Authentication platform computer 120 may check such information to determine if the registered mobile ID was recently activated on a new mobile device or new SIM card, which may indicate fraudulent activity. For example, authentication platform computer 120 may check such information in response to a sensitive login such as the customer logging in to a bank account.

2FA entries 130 are created upon the customer deciding to enroll customer mobile device 170 as a trusted device for second-factor authentication. Enrolling customer mobile device 170 entails the customer establishing trust between customer mobile device 170 and authentication platform computer 120. Once trust is established, an entry is added to 2FA entries 130, the entry including the customer's mobile ID that was registered with the vendor and one or more additional items. The additional items are used for verifying that the customer possesses customer mobile device 170, such possession being a second authentication factor. There are various manners by which the customer may enroll customer mobile device 170 and subsequently prove possession of customer mobile device 170.

As one example, during enrollment, web browser 174 (or another application of software platform 172) generates a push notification token that includes (is mapped to) a network address. Data routed according to the network address of the push notification token is only accessible to web browser 174 (or to the other application that generated the push notification token) via a private push notification channel. Customer mobile device 170 then transmits the push notification token to authentication platform computer 120 to be stored in the customer's entry of 2FA entries 130. Later, as a second-factor authentication, authentication platform computer 120 transmits an OTP that is routed according to the network address of the push notification token, and the OTP is received at customer mobile device 170 as a push notification to then be entered by the customer.

As another example, during enrollment, an operating system (OS) of software platform 172 generates a cryptographic key or a pair of cryptographic keys including a public key and a private key. In the case of a public-private key pair, the OS stores the private key, and customer mobile device 170 transmits the public key to authentication platform computer 120 to be stored in the customer's entry of 2FA entries 130. Later, as a second-factor authentication, authentication platform computer 120 transmits data to customer mobile device 170 to be signed by the private key. Authentication platform computer 120 then decrypts the signed data using the public key and compares the decrypted data to the original data transmitted to customer mobile device 170. Enrolling a customer mobile device as a trusted device and proving possession of the trusted device are disclosed in U.S. patent application Ser. No. 17/141,643, filed Jan. 5, 2021, published as U.S. Patent Publication No. 2021/0211876 on Jul. 8, 2021, the entire contents of which are incorporated by reference.

Cellular network provider platform 140 is a platform of a cellular network provider that provides cellular networking services to customer mobile device 170. In certain situations, authentication platform computer 120 and customer mobile device 170 communicate with cellular network provider platform 140. Such communication enables authentication platform computer 120 to determine the mobile ID activated on customer mobile device 170. Such determinations are described below in conjunction with FIGS. 7 and 8.

As discussed above, customer computer 150 communicates with vendor computer 110 via public network 102. Public network 102 is a wireless local area network (WLAN) that includes one or more devices based on the Institute of Electrical and Electronics Engineers (IEEE) 802.11 standard. Customer mobile device 170 communicates with authentication platform computer 120 and with cellular network provider platform 140 via cellular network 104. Cellular network 104 is a network with one or more base stations that communicate wirelessly with a landline system such as a public switched telephone network (PSTN).

Figure 2:
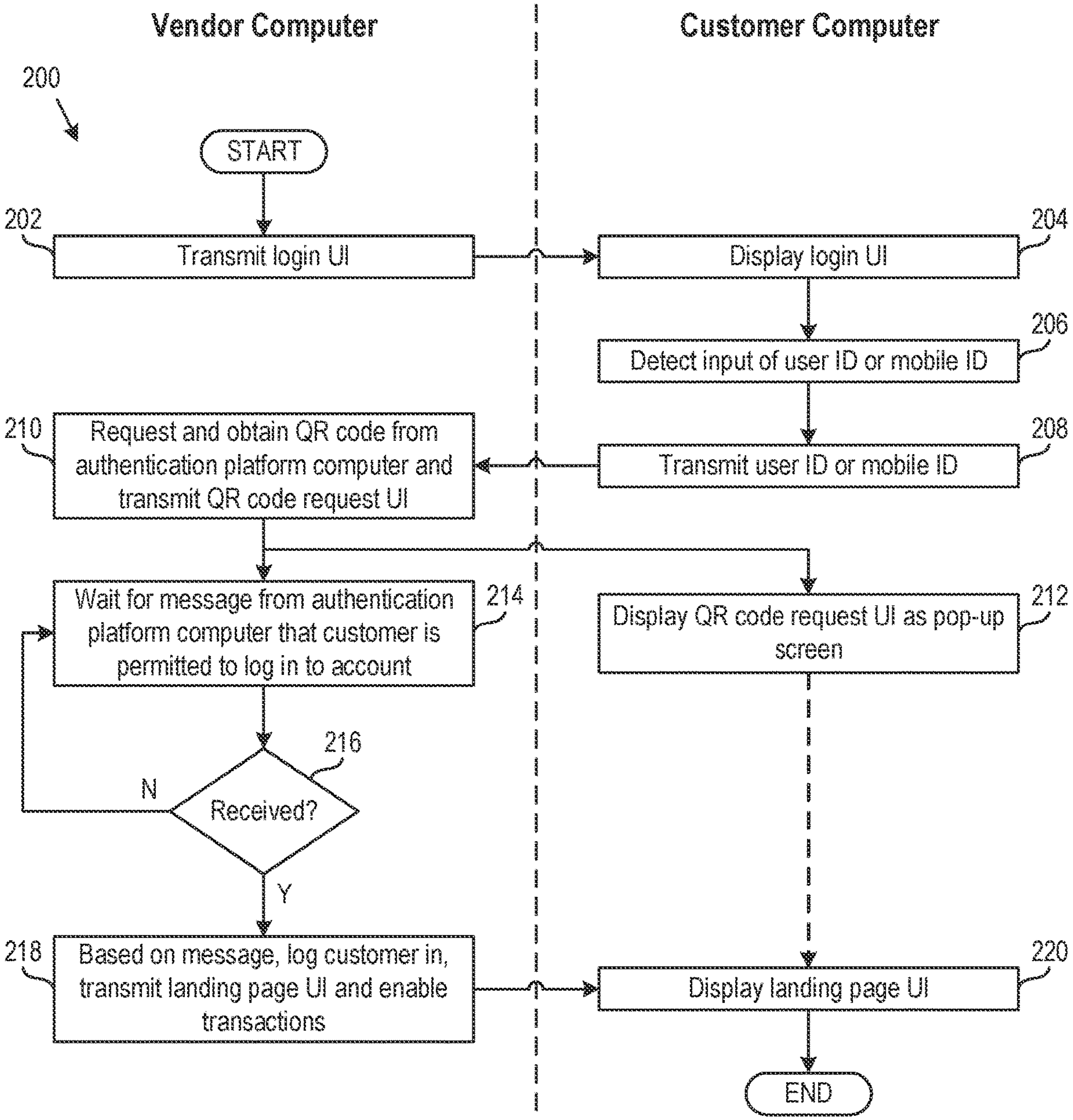
FIG. 2 is a flow diagram of a method performed by computers of a vendor and a customer to authenticate the customer and allow the customer to log in to an account with the vendor, according to an embodiment.
Figure 9A:
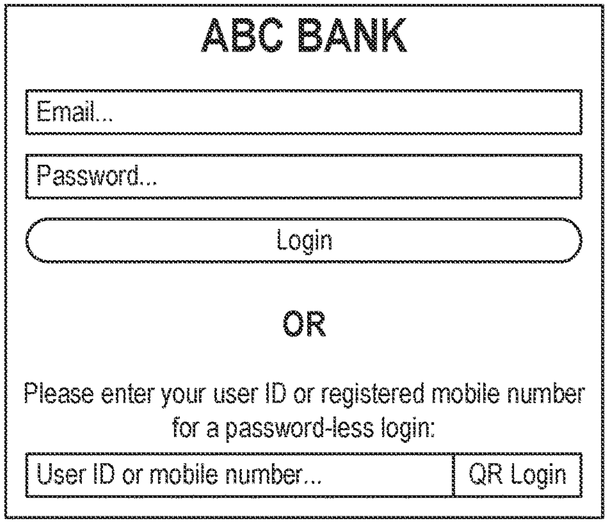
FIG. 9A is a block diagram illustrating a sample user interface indicating how the customer may log in to the account.

FIG. 2 is a flow diagram of a method 200 performed by vendor computer 110 and customer computer 150 to authenticate the customer and allow the customer to log in the customer's account with the vendor, according to an embodiment. At step 202, vendor computer 110 transmits a login UI to customer computer 150. The login UI prompts the customer to enter either a user ID of the account or a registered mobile ID associated with the account. A sample login UI is illustrated in FIG. 9A. At step 204, customer computer 150 displays the login UI. At step 206, customer computer 150 detects input of either a user ID or mobile ID. For example, the customer may type the input on a keyboard and click a login button of the login UI.

Figure 9B:
FIG. 9B is a block diagram illustrating a sample user interface that displays a code in a pop-up screen for the customer to scan.

At step 208, customer computer 150 transmits the entered user ID or mobile ID to vendor computer 110. At step 210, vendor computer 110 requests and obtains a QR code from authentication platform computer 120, as discussed further below in conjunction with FIG. 3. Vendor computer 110 then transmits a QR code request UI to customer computer 150. The QR code request UI displays the QR code and prompts the customer to scan the QR code using customer mobile device 170. A sample QR code request UI is illustrated in FIG. 9B. At step 212, customer computer 150 displays the QR code request UI, e.g., as a pop-up screen.

At step 214, vendor computer 110 waits for a message from authentication platform computer 120 indicating that the customer is permitted to log in to the account. Authentication platform computer 120 generates such a message upon the customer scanning the QR code and upon further verification, as discussed below. At step 216, if such a message has not been received, method 200 returns to step 214, and vendor computer 110 continues to wait. Otherwise, if such a message has been received, method 200 moves to step 218.

Figure 9C:
FIG. 9C is a block diagram illustrating a sample landing page that is displayed to the customer upon successful login to the account.

At step 218, based on the message received from authentication platform computer 120, vendor computer 110 logs the customer in the account, transmits a landing page UI to customer computer 150, and enables the customer to engage in transactions with the vendor. The landing page UI informs the customer that the customer has successfully logged in and provides an avenue for engaging in the transactions. A sample landing page UI is illustrated in FIG. 9C. At step 220, customer computer 150 displays the landing page UI. After step 220, method 200 ends, and the customer performs transactions, e.g., pays for goods or services of the vendor.

Figure 3:
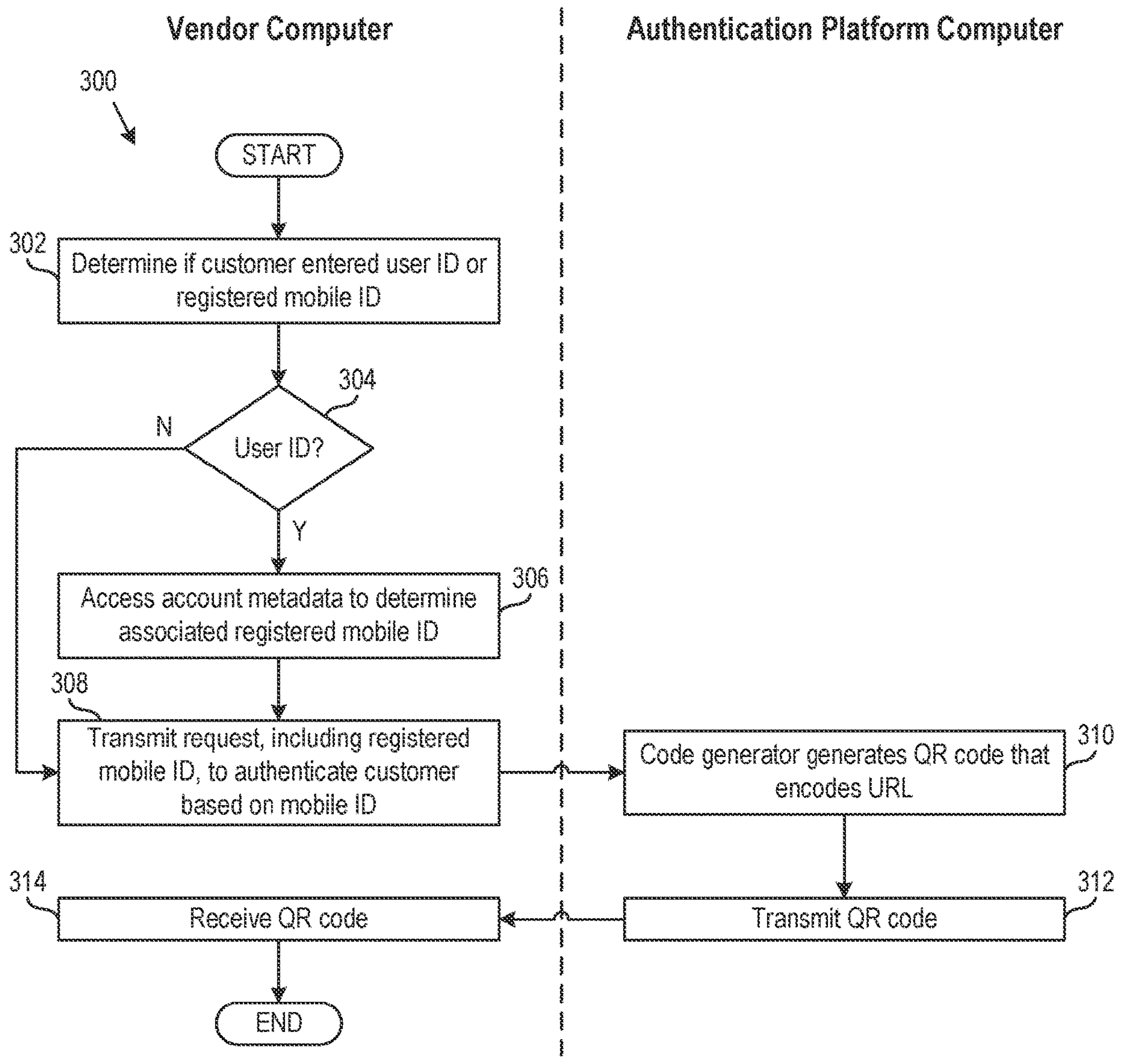
FIG. 3 is a flow diagram of a method performed by computers of the vendor and an authentication platform to provide the vendor with a code to be used for authenticating the customer, according to an embodiment.

FIG. 3 is a flow diagram of a method 300 performed by vendor computer 110 and authentication platform computer 120 to provide the vendor with a QR code to be used for authenticating the customer, according to an embodiment. Method 300 is performed after the customer enters a user ID or mobile ID through a login UI displayed on customer computer 150. At step 302, vendor computer 110 determines if the customer entered a user ID or a registered mobile ID. At step 304, if the customer entered a user ID, method 300 moves to step 306.

At step 306, vendor computer 110 accesses account metadata 114 to determine which mobile ID is registered with the account associated with the user ID. Returning to step 304, if the customer entered a registered mobile ID, method 300 moves directly to step 308. It should be noted that if the customer enters a user ID or mobile ID that is not registered with any account of the vendor, vendor computer 110 transmits an error message to customer computer 150, and method 300 ends. Assuming there is a registered mobile ID (either entered by the customer or determined at step 306), at step 308, vendor computer 110 transmits a request to authentication platform computer 120 to authenticate the customer based on the registered mobile ID. The request includes the registered mobile ID.

At step 310, in response to request, authentication platform computer 120 generates a QR code that encodes a URL of authentication platform computer 120. At step 312, authentication platform computer 120 transmits the generated QR code to vendor computer 110. At step 314, vendor computer 110 receives the QR code. After step 314, method 300 ends.

Figure 4:
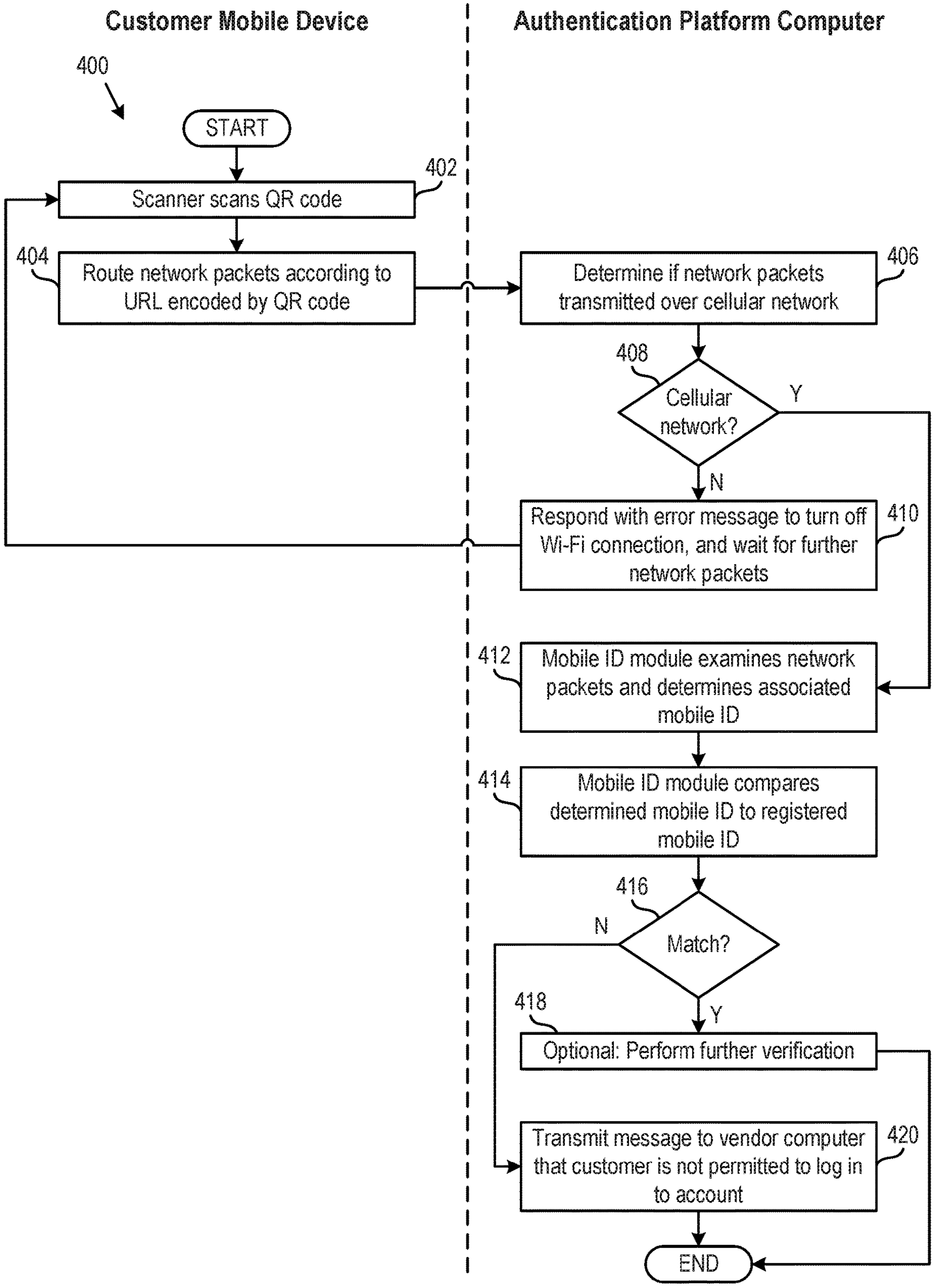
FIG. 4 is a flow diagram of a method performed by a mobile device of the customer and the computer of the authentication platform to perform a first step of authenticating the customer, according to an embodiment.

FIG. 4 is a flow diagram of a method 400 performed by customer mobile device 170 and authentication platform computer 120 to perform a first step of authenticating the customer, according to an embodiment. Method 400 is performed after customer computer 150 displays a QR code generated by authentication platform computer 120. At step 402, the customer uses scanner 176 to scan the QR code. At step 404, web browser 174 navigates to the URL encoded by the QR code, and customer mobile device 170 routes network packets to authentication platform computer 120 according to the URL. At step 406, authentication platform computer 120 determines if the network packets were routed over cellular network 104, i.e., not over public network 102. Authentication platform computer 120 determines this based on a source internet protocol (IP) address of the network packets. Authentication platform computer 120 recognizes the IP address as being owned by either a company providing cellular services or a company providing Wi-Fi services.

At step 408, if the network packets were not transmitted over cellular network 104, method 400 moves to step 410. At step 410, authentication platform computer 120 responds to customer mobile device 170 with an error message to turn off the Wi-Fi connection of customer mobile device 170. The error message is displayed on customer mobile device 170. Method 400 then returns to step 402, and the customer again uses scanner 176 to scan the QR code. It should be noted that instead of responding directly to customer mobile device 170 with the error message, authentication platform computer 120 may instead transmit the error message to vendor computer 110, and vendor computer 110 may forward the error message to customer computer 150 to be displayed to the customer thereon.

Returning to step 408, if the network packets were transmitted over cellular network 104, method 400 moves to step 412. At step 412, mobile ID module 126 examines the network packets and determines the mobile ID associated with the network packets, i.e., activated on customer mobile device 170. The mobile ID may be included in a header portion of the network packets. If not included in the header portion, authentication platform computer 120 communicates with cellular network provider platform 140 and/or customer mobile device 170 to determine the mobile ID, as discussed below in conjunction with FIGS. 7 and 8.

At step 414, mobile ID module 126 compares the determined mobile ID to a registered mobile ID received from vendor computer 110. At step 416, if the mobile IDs match, method 400 moves to step 418. At step 418, authentication platform computer 120 optionally performs further verification of the customer, as discussed below in conjunction with FIGS. 5 and 6. For example, authentication platform computer 120 may perform step 418 in response to a sensitive login such as the customer logging in to a bank account. Otherwise, if no further verification is performed, authentication platform computer 120 transmits a message to vendor computer 110 that the customer is permitted to log in to the account, and vendor computer 110 logs the customer in and transmits a landing page UI to customer computer 150. After step 418, method 400 ends.

Returning to step 416, if the mobile IDs do not match, method 400 moves to step 420. At step 420, authentication platform computer 120 transmits a message to vendor computer 110 that the customer is not permitted to log in to the account. Vendor computer 110 then transmits an error message to customer computer 150 indicating that password-less authentication has failed. After step 420, method 400 ends.

It should be noted that method 400 discusses transmitting an error message to the customer to turn off the customer's Wi-Fi connection if the customer scans the QR code while connected to Wi-Fi. Alternative approaches may be used that do not require the customer to turn off the Wi-Fi connection. For example, authentication platform computer 120 may instruct customer mobile device 170 to open a verification port thereon and bind the verification port to a cellular network interface. Customer mobile device 170 then transmits one or more network packets to authentication platform computer 120 from the verification port via cellular network 104. Those network packets are used to determine the associated mobile ID for comparison to the registered mobile ID (similar to steps 412 and 414). Determining a mobile ID of a customer mobile device that is connected to Wi-Fi is disclosed in U.S. Pat. No. 11,032,272, filed Aug. 13, 2018, the entire contents of which are incorporated by reference.

Figure 5:
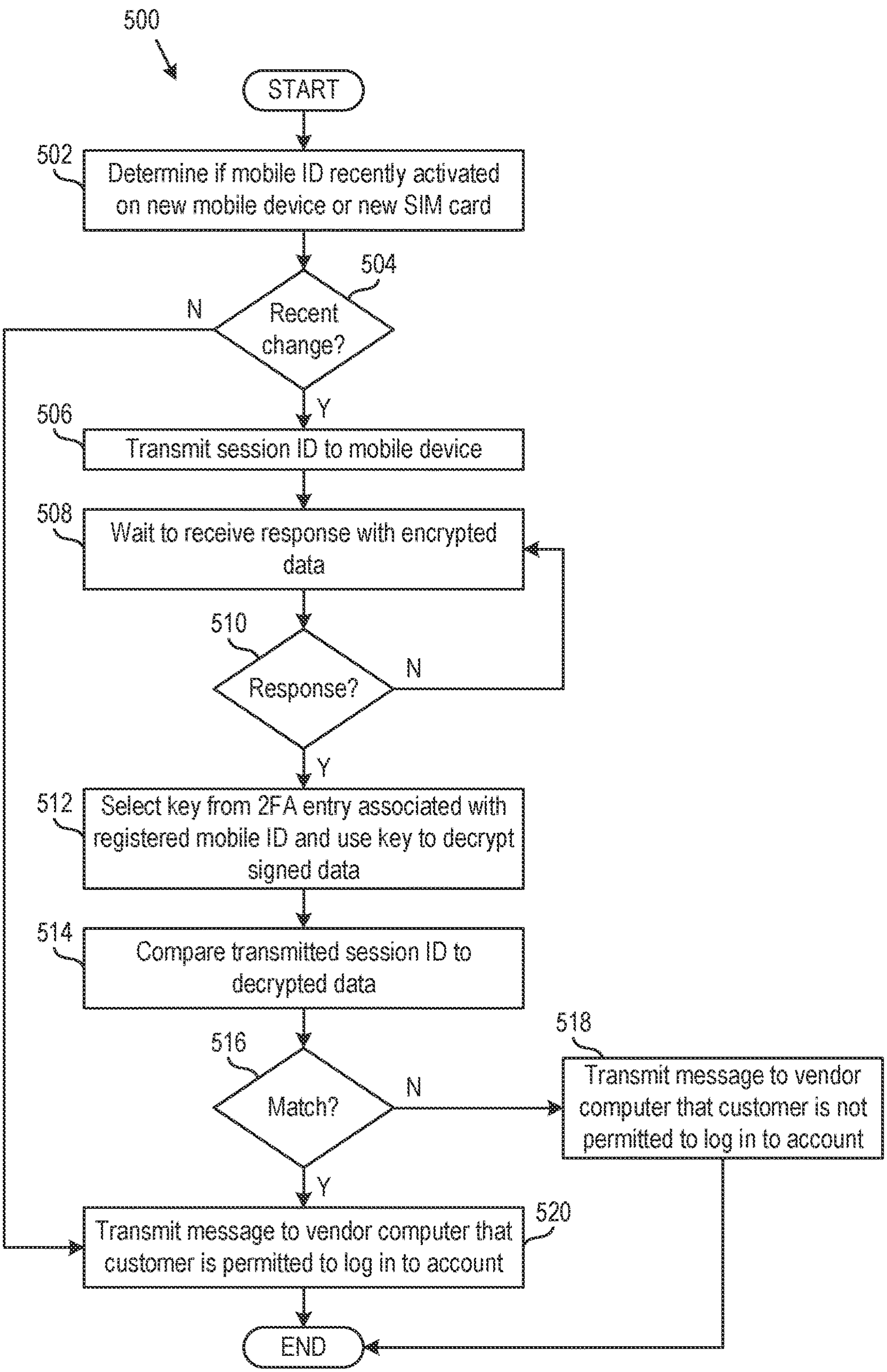
FIG. 5 is a flow diagram of a method performed by the computer of the authentication platform to perform a second step of authenticating the customer, according to an embodiment.

FIG. 5 is a flow diagram of a method 500 performed by authentication platform computer 120 to perform a second step of authenticating the customer, according to an embodiment. Method 500 is optionally performed for further verification of the customer after the customer successfully scans a QR code using customer mobile device 170. At step 502, authentication platform computer 120 determines if the customer's registered mobile ID was recently activated on a new mobile device or new SIM card, e.g., in the past day. Authentication platform computer 120 may determine this by checking device history database 128. Authentication platform computer 120 may alternatively transmit a request to cellular network provider platform 140 for an indication of whether the mobile ID was recently activated on a new mobile device or new SIM card, the request including the mobile ID. Cellular network provider platform 140 then returns such an indication with respect to the mobile ID. Determining that a mobile ID was recently activated on a new mobile device or new SIM card is disclosed in U.S. patent application Ser. No. 16/262,811, filed Jan. 30, 2019, published as U.S. Patent Publication No. 2020/0245142 on Jul. 30, 2020, the entire contents of which are incorporated by reference.

At step 504, if there has not been a recent change to a new mobile device or new SIM card, method 500 moves directly to step 520. Otherwise, if there has been such a recent change, which potentially indicates fraudulent activity, method 500 moves to step 506. At step 506, authentication platform computer 120 transmits a session ID to the mobile device that the registered mobile ID is currently activated on. The session ID can be any piece of data, the significance of the session ID being to verify if the mobile device can sign the session ID using a cryptographic key stored in customer mobile device 170, i.e., to verify that the mobile device is customer mobile device 170.

At step 508, authentication platform computer 120 waits for a response from the mobile device, which should include encrypted data. At step 510, if authentication platform computer 120 has not yet received a response, method 500 returns to step 508, and authentication platform computer 120 continues to wait. Once authentication platform computer 120 receives a response, method 500 moves to step 512. At step 512, authentication platform computer 120 selects a cryptographic key from one of 2FA entries 130. Specifically, authentication platform computer 120 selects a key from an entry associated with the registered mobile ID. Authentication platform computer 120 then uses the key to decrypt the response from the mobile device.

At step 514, authentication platform computer 120 compares the session ID that was transmitted to the mobile device to the decrypted data. At step 516, if the transmitted session ID does not match the decrypted data, method 500 moves to step 518. At step 518, authentication platform computer 120 transmits a message to vendor computer 110 that the customer is not permitted to log in to the account. Vendor computer 110 then transmits an error message to customer computer 150 indicating that password-less authentication has failed. After step 518, method 500 ends.

Returning to step 516, if the transmitted session ID matches the decrypted data, method 500 moves to step 520. At step 520, authentication platform computer 120 transmits a message to vendor computer 110 that the customer is permitted to log in to the account. Vendor computer 110 then logs the customer in and transmits a landing page UI to customer computer 150. After step 520, method 500 ends.

It should be noted method 500 does not require any manual input by the customer. Method 500 is thus a seamless second authentication factor for increasing the security of the customer's login after the user scans the QR code. In particular, method 500 requires a person attempting to log in to the customer's account to possess customer mobile device 170, which stores the customer's private key. Other authentication factors are also possible, including that discussed below in conjunction with FIG. 6. It should also be noted that if there has been a recent change to a new mobile device or new SIM card, as determined at step 504, then instead of performing a second factor authentication, authentication platform computer 120 may simply transmit a message to vendor computer 110 that the customer is not permitted to log in to the account based on the QR code.

Figure 6:
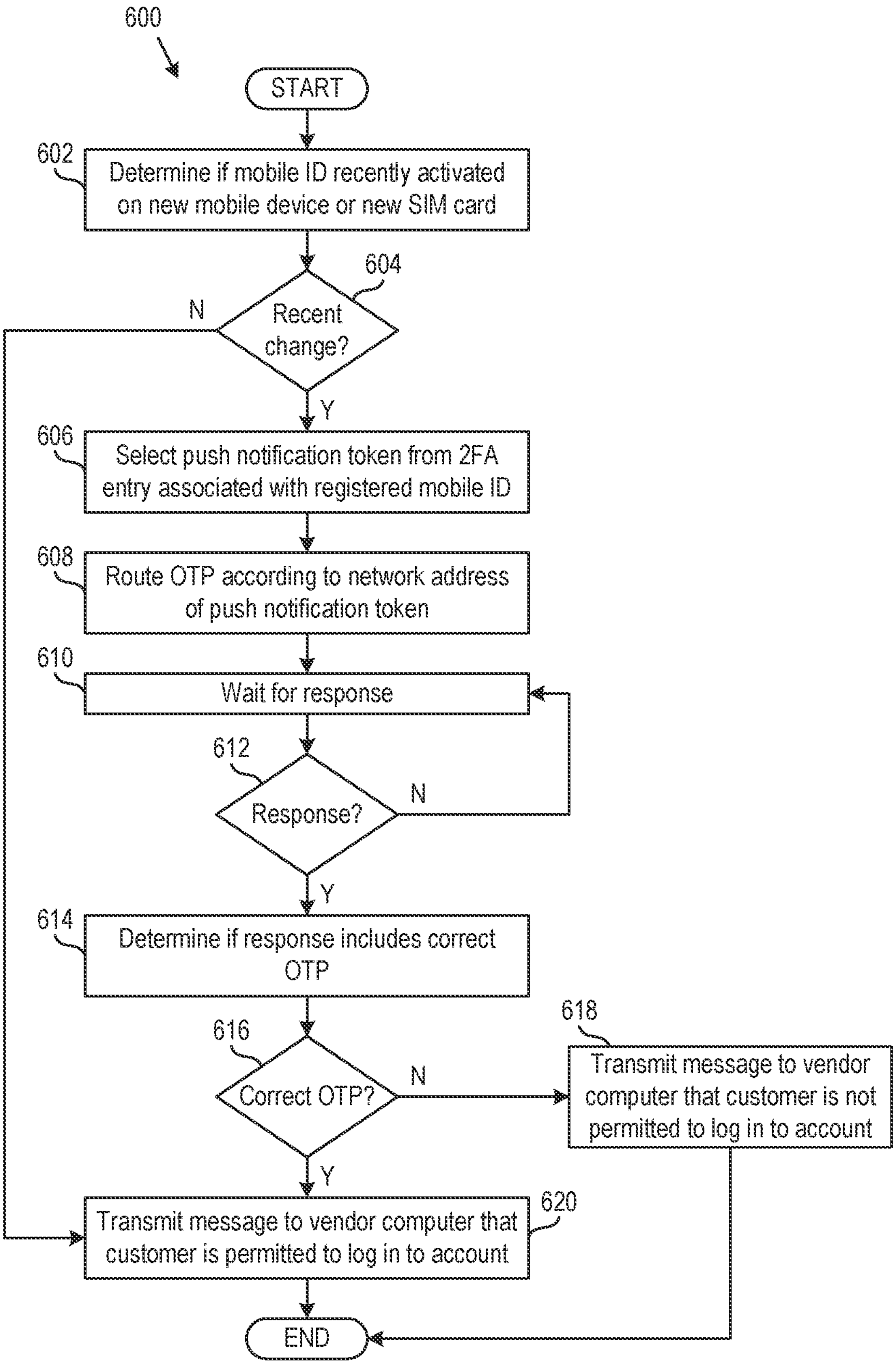
FIG. 6 is a flow diagram of an alternative method performed by the computer of the authentication platform to perform a second step of authenticating the customer, according to an embodiment.

FIG. 6 is a flow diagram of a method 600 performed by authentication platform computer 120 to perform a second step of authenticating the customer, according to an embodiment. Method 600 is optionally performed for further verification of the customer after the customer successfully scans a QR code using customer mobile device 170. Method 600 may be performed instead of method 500 of FIG. 5. At step 602, authentication platform computer 120 determines if the customer's registered mobile ID was recently activated on a new mobile device or new SIM card, e.g., in the past day. As discussed earlier, authentication platform computer 120 may determine this by checking device history database 128 or may acquire this information from cellular network provider platform 140.

At step 604, if there has not been a recent change to a new mobile device or new SIM card, method 600 moves directly to step 620. Otherwise, if there has been such a recent change, method 600 moves to step 606. At step 606, authentication platform computer 120 selects a push notification token from one of 2FA entries 130. Specifically, authentication platform computer 120 selects a token from an entry associated with the registered mobile ID. At step 608, authentication platform computer 120 uses the token to transmit an OTP to customer mobile device 170 as a push notification. In other words, authentication platform computer 120 routes the OTP according to the network address of the push notification token, and customer mobile device 170 receives the OTP via a private push notification channel (not by SMS).

At step 610, authentication platform computer 120 waits for a response to the push notification. At step 612, if authentication platform computer 120 has not yet received a response, method 600 returns to step 610, and authentication platform computer 120 continues to wait. Once authentication platform computer 120 receives a response, method 600 moves to step 614. At step 614, authentication platform computer 120 determines if the response includes the correct OTP, i.e., includes the OTP transmitted at step 608.

At step 616, if the response does not include the correct OTP, method 600 moves to step 618. At step 618, authentication platform computer 120 transmits a message to vendor computer 110 that the customer is not permitted to log in to the account. Vendor computer 110 then transmits an error message to customer computer 150 indicating that password-less authentication has failed. After step 618, method 600 ends.

Returning to step 616, if the response includes the correct OTP, method 600 moves to step 620. At step 620, authentication platform computer 120 transmits a message to vendor computer 110 that the customer is permitted to log in to the account. Vendor computer 110 then logs the customer in and transmits a landing page UI to customer computer 150. After step 620, method 600 ends.

It should be noted that method 600 does not require the customer to memorize a password. Method 600 thus increases the security of the customer's login after the user scans the QR code without the user memorizing and managing a password. Method 600 merely requires a person attempting to log in to the customer's account to possess customer mobile device 170, to which the push notification is sent, and to then enter a received OTP. Other authentication factors are also possible, including that discussed above in conjunction with FIG. 5.

Method 600 involves transmitting an OTP as a type of push notification known as a noninteractive push notification. In other embodiments, an interactive push notification may be used to prove possession of customer mobile device 170. An interactive push notification requests the customer to respond directly to the push notification. For example, the customer may respond "yes" or "no" to an interactive push notification that asks whether or not the customer is attempting to log in to his or her account. Responding "yes" allows customer computer 150 to log in to the account, while responding "no" prevents such access. It should also be noted that if there has been a recent change to a new mobile device or new SIM card, as determined at step 604, then instead of performing a second factor authentication, authentication platform computer 120 may simply transmit a message to vendor computer 110 that the customer is not permitted to log in to the account based on the QR code.

Figure 7:
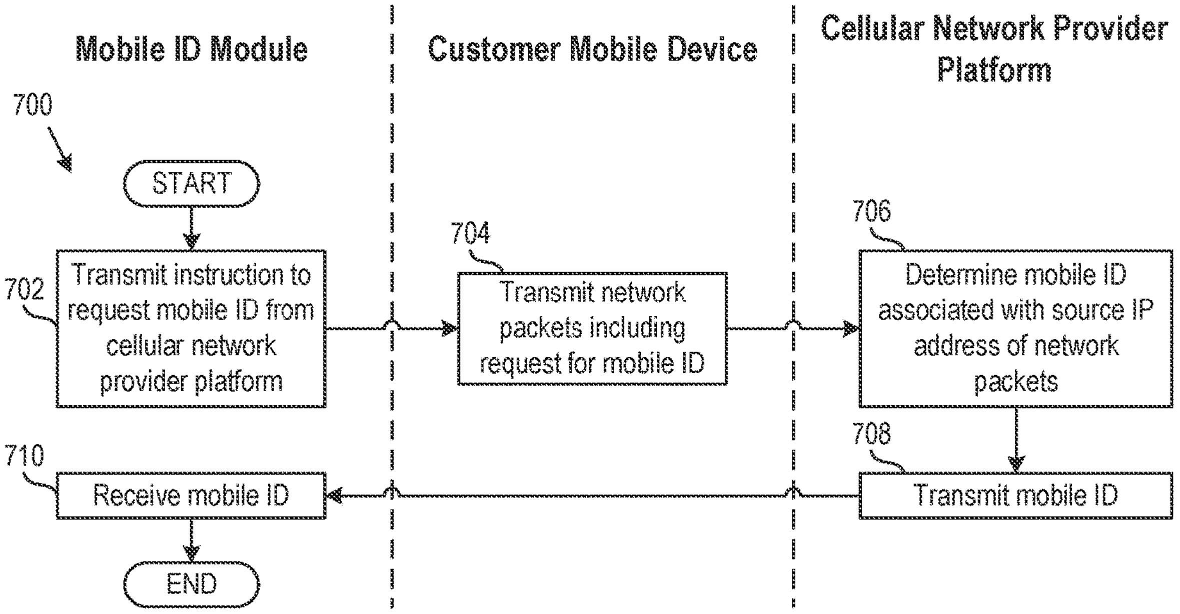
FIG. 7 is a flow diagram of a method performed by the computer of the authentication platform, the mobile device of the customer, and a platform of a cellular network provider to determine a mobile identifier activated on the mobile device of the customer, according to an embodiment.

FIG. 7 is a flow diagram of a method 700 performed by mobile ID module 126, customer mobile device 170, and cellular network provider platform 140 to determine the mobile ID activated on customer mobile device 170, according to an embodiment. Method 700 is performed after the customer scans the QR code and network packets are routed to authentication platform computer 120 according to the URL encoded by the QR code. In particular, method 700 is performed when the mobile ID is not included in a header portion of the network packets routed to authentication platform computer 120. At step 702, mobile ID module 126 transmits an instruction to customer mobile device 170 to communicate with cellular network provider platform 140 and request the customer mobile ID.

At step 704, customer mobile device 170 transmits network packets to cellular network provider platform 140 including a request for the mobile ID. At step 706, cellular network provider platform 140 identifies a source IP address of the network packets transmitted at step 704. Cellular network provider platform 140 then determines a mobile ID associated with the source IP address. At step 708, cellular network provider platform 140 transmits the mobile ID to mobile ID module 126. At step 710, mobile ID module 126 receives the mobile ID, and method 700 ends. It should be noted that method 700 is performed without manual input by the customer.

Figure 8:
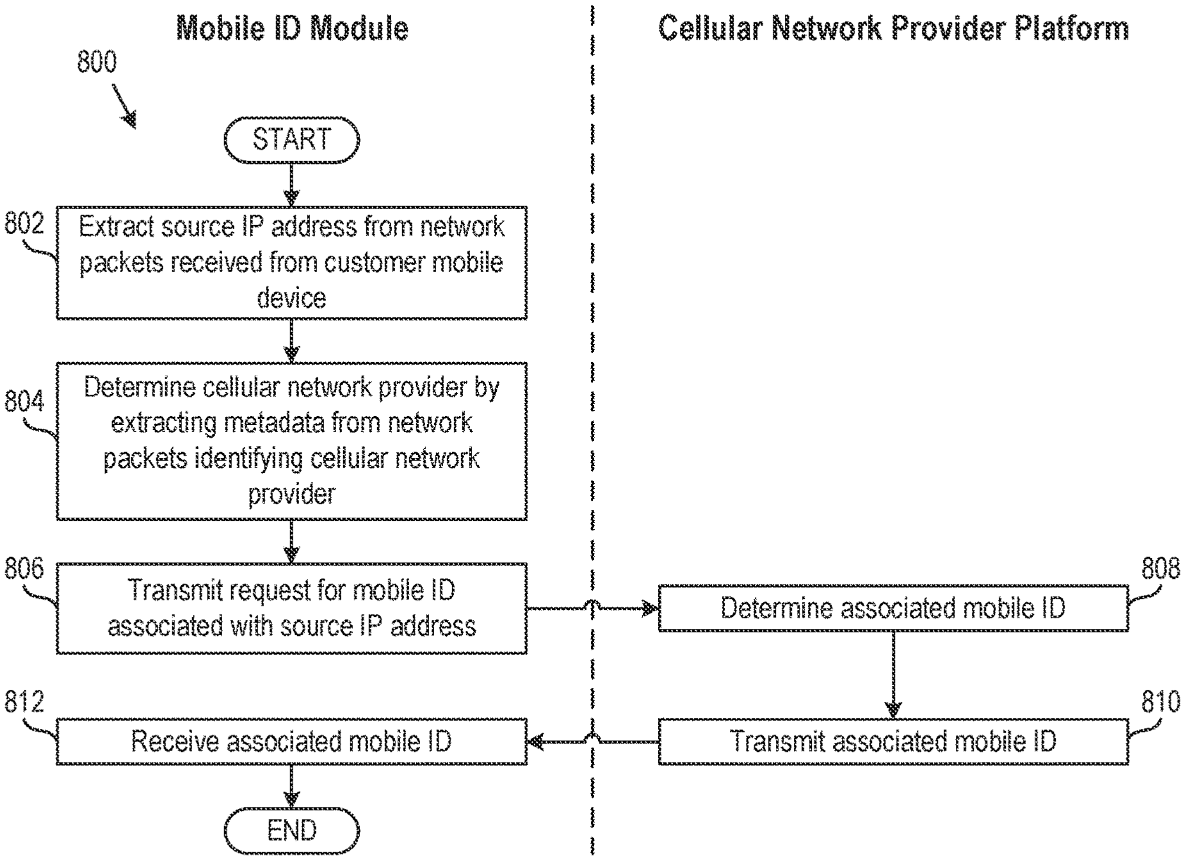
FIG. 8 is a flow diagram of an alternative method performed by the computer of the authentication platform and the platform of the cellular network provider to determine the mobile identifier activated on the mobile device of the customer, according to an embodiment.

FIG. 8 is a flow diagram of a method 800 performed by mobile ID module 126 and cellular network provider platform 140 to determine the mobile ID activated on customer mobile device 170, according to an embodiment. Method 800 is performed after the customer scans the QR code and network packets are routed to authentication platform computer 120 according to the URL encoded by the QR code. Method 800 may be performed instead of method 700 of FIG. 7 in certain cases. In particular, method 800 is performed when metadata identifying the cellular network provider that provides cellular networking services to customer mobile device 170, is inserted into the network packets routed to authentication platform computer 120.

At step 802, mobile ID module 126 extracts a source IP address from the network packets routed to authentication platform computer 120. At step 804, mobile ID module 126 determines the cellular network provider by extracting the metadata from the network packets identifying the cellular network provider. At step 806, mobile ID module 126 transmits a request to cellular network provider platform 140 for a mobile ID associated with the source IP address extracted at step 802.

At step 808, cellular network provider platform 140 determines the associated mobile ID. At step 810, cellular network provider platform 140 transmits the mobile ID to mobile ID module 126. At step 812, mobile ID module 126 receives the mobile ID, and method 800 ends. It should be noted that method 800 is performed without manual input by the customer. Identifying a mobile ID based on network packets is disclosed in U.S. Pat. No. 11,032,272, filed Aug. 13, 2018, the entire contents of which are incorporated by reference.

FIG. 9A is a block diagram illustrating a sample login UI for indicating how the customer may log in to the user's account with the vendor. The login UI is displayed to the customer on customer computer 150 after the customer navigates to the vendor's website using web browser 154 or after the customer opens vendor application 156. The login UI provides the customer with the option for a password-less login. To initiate the password-less login, the login UI prompts the customer to enter either a user ID of the account or a registered mobile ID associated with the account. Upon entering the user ID or mobile ID, the customer may press "QR Login" to transmit the user ID or mobile ID to vendor computer 110 and trigger the password-less login process.

FIG. 9B is a block diagram illustrating a sample QR code request UI for displaying a QR code in a pop-up screen for the customer to scan. The QR code request UI is displayed to the customer on customer computer 150 after the customer enters a user ID or mobile ID via the login UI. The QR code request UI displays a QR code generated by authentication platform computer 120. The QR code request UI also prompts the customer to scan the QR code using customer mobile device 170.

FIG. 9C is a block diagram illustrating a sample landing page UI that is displayed to the customer upon successful login to the account. The landing page UI is displayed to the customer on customer computer 150 after the customer scans the QR code and the customer is authenticated. The landing page UI informs the customer with a welcome message that the customer has successfully logged in. After reaching the landing page, the user engages in transactions with the vendor.

While some processes and methods having various operations have been described, one or more embodiments also relate to a device or an apparatus for performing these operations. The apparatus may be specially constructed for required purposes, or the apparatus may be a general-purpose computer selectively activated or configured by a computer program stored in the computer. Various general-purpose machines may be used with computer programs written in accordance with the teachings herein, or it may be more convenient to construct a more specialized apparatus to perform the required operations.

Although one or more embodiments of the present invention have been described in some detail for clarity of understanding, certain changes may be made within the scope of the claims. Accordingly, the described embodiments are to be considered as illustrative and not restrictive, and the scope of the claims is not to be limited to details given herein but may be modified within the scope and equivalents of the claims. In the claims, elements and/or steps do not imply any particular order of operation unless explicitly stated in the claims.

Boundaries between components, operations, and data stores are somewhat arbitrary, and particular operations are illustrated in the context of specific illustrative configurations. Other allocations of functionality are envisioned and may fall within the scope of the invention. In general, structures and functionalities presented as separate components in exemplary configurations may be implemented as a combined structure or component. Similarly, structures and functionalities presented as a single component may be implemented as separate components. These and other variations, additions, and improvements may fall within the scope of the appended claims.

We claim:

1. A method of authenticating a customer to allow the customer to log in to an account of the customer with a vendor that provides goods or a service, the method comprising:

in response to a request to authenticate the customer based on a first phone number that is registered with the account, generating a code that encodes a uniform resource locator (URL), and then transmitting the generated code to a computer of the vendor that is managing access to the account;

examining network packets transmitted by a computer of the customer to the URL and determining a second phone number using the network packets;

comparing the first phone number to the second phone number; and based on a determination that the first phone number matches the second phone number, determining that the customer is authenticated, and then transmitting a message to the computer of the vendor that the customer is permitted to log in to the account.

2. The method of claim 1, wherein the step of determining the second phone number comprises extracting the second phone number from a header portion of the network packets.

3. The method of claim 1, wherein the computer of the customer is a mobile device having the first phone number, and wherein the step of determining the second phone number comprises: (1) transmitting an instruction to the mobile device instructing the mobile device to communicate with a platform of a cellular network provider that provides cellular networking services to the mobile device, and then (2) receiving the second phone number from the platform of the cellular network provider.

4. The method of claim 1, wherein the computer of the customer is a mobile device having the first phone number, and wherein the step of determining the second phone number comprises: (1) extracting a source internet protocol (IP) address from the network packets, then (2) transmitting a request to a platform of a cellular network provider that provides cellular networking services to the mobile device, for a phone number associated with the source IP address, and then (3) receiving the phone number associated with the source IP address from the platform of the cellular network provider as the second phone number.

5. The method of claim 4, wherein the step of determining the second phone number further comprises determining the cellular network provider by extracting metadata from the network packets that identifies the cellular network provider.

6. The method of claim 1, wherein the request to authenticate the customer is received from the computer of the vendor in response to the first phone number being specified as a user input via a login user interface (UI) of the computer of the vendor.

7. The method of claim 1, wherein the request to authenticate the customer is received from the computer of the vendor in response to a user identifier (ID) separate from the first phone number being specified as a user input via a login user interface (UI) of the computer of the vendor.

8. The method of claim 1, wherein the step of determining that the customer is authenticated includes determining that the first phone number has neither been activated on a new mobile device nor been activated on a new subscriber identity module (SIM) card over a previous time period.

9. The method of claim 1, wherein the computer of the customer is a mobile device having the first phone number, the method further comprising:

transmitting a session identifier (ID) to the mobile device;

after transmitting the session ID, receiving an encrypted response;

decrypting the encrypted response by using a cryptographic key associated with the first phone number; and comparing the decrypted response to the session ID, wherein the step of determining that the customer is authenticated includes determining that the decrypted response includes the session ID.

10. The method of claim 1, further comprising:

selecting a push notification token associated with the first phone number;

routing a one-time passcode (OTP) according to a network address included by the push notification token; and after routing the OTP, receiving a response and determining that the response includes the OTP, wherein the step of determining that the customer is authenticated includes determining that the response includes the OTP.

11. An authentication computer configured to execute on a processor of a hardware platform to perform the following steps to allow a customer to log in to an account of the customer with a vendor that provides goods or a service:

in response to a request to authenticate the customer based on a first phone number that is registered with the account, generate a code that encodes a uniform resource locator (URL), and then transmit the generated code to a computer of the vendor that is managing access to the account;

examine network packets transmitted by a computer of the customer to the URL and determine a second phone number using the network packets;

compare the first phone number to the second phone number; and based on a determination that the first phone number matches the second phone number, determine that the customer is authenticated, and then transmit a message to the computer of the vendor that the customer is permitted to log in to the account.

12. The authentication computer of claim 11, further configured to:

extract the second phone number from a header portion of the network packets when determining the second phone number.

13. The authentication computer of claim 11, wherein the computer of the customer is a mobile device having the first phone number, and wherein when determining the second phone number, the authentication computer is further configured to:

transmit an instruction to the mobile device instructing the mobile device, to communicate with a platform of a cellular network provider that provides cellular networking services to the mobile device, and then receive the second phone number from the platform of the cellular network provider.

14. The authentication computer of claim 11, wherein the computer of the customer is a mobile device having the first phone number, and wherein when determining the second phone number, the authentication computer is further configured to:

extract a source internet protocol (IP) address from the network packets, then transmit a request to a platform of a cellular network provider that provides cellular networking services to the mobile device, for a phone number associated with the source IP address, and then receive the phone number associated with the source IP address from the platform of the cellular network provider as the second phone number.

15. The authentication computer of claim 14, wherein when determining the second phone number, the authentication computer is further configured to:

determine the cellular network provider by extracting metadata from the network packets that identifies the cellular network provider.

16. The authentication computer of claim 11, wherein the request to authenticate the customer is received from the computer of the vendor in response to the first phone number being specified as a user input via a login user interface (UI) of the computer of the vendor.

17. The authentication computer of claim 11, wherein the request to authenticate the customer is received from the computer of the vendor in response to a user identifier (ID) separate from the first phone number being specified as a user input via a login user interface (UI) of the computer of the vendor.

18. The authentication computer of claim 11, wherein when determining that the customer is authenticated, the authentication computer is further configured to:

determine that the first phone number has neither recently been activated on a new mobile device nor been activated on a new subscriber identity module (SIM) card over a previous time period.

19. The authentication computer of claim 11, wherein the computer of the customer is a mobile device having the first phone number, and wherein the authentication computer is further configured to:

transmit a session identifier (ID) to the mobile device;

after transmitting the session ID, receive an encrypted response;

decrypt the encrypted response by using a cryptographic key associated with the first phone number; and when determining that the customer is authenticated, compare the decrypted response to the session ID to determine that the decrypted response includes the session ID.

20. The authentication computer of claim 11, further configured to:

select a push notification token associated with the first phone number;

route a one-time passcode (OTP) according to a network address included by the push notification token; and after routing the OTP, when determining that the customer is authenticated, receive a response and determine that the response includes the OTP.

* * * * *